Dec. 5, 1933.　　　D. PARRETT　　　1,937,839
TRACTOR
Filed Sept. 13, 1930　　2 Sheets-Sheet 1

Inventor:
Dent Parrett
By Walter M. Fuller
atty.

Dec. 5, 1933. D. PARRETT 1,937,839
TRACTOR
Filed Sept. 13, 1930 2 Sheets-Sheet 2
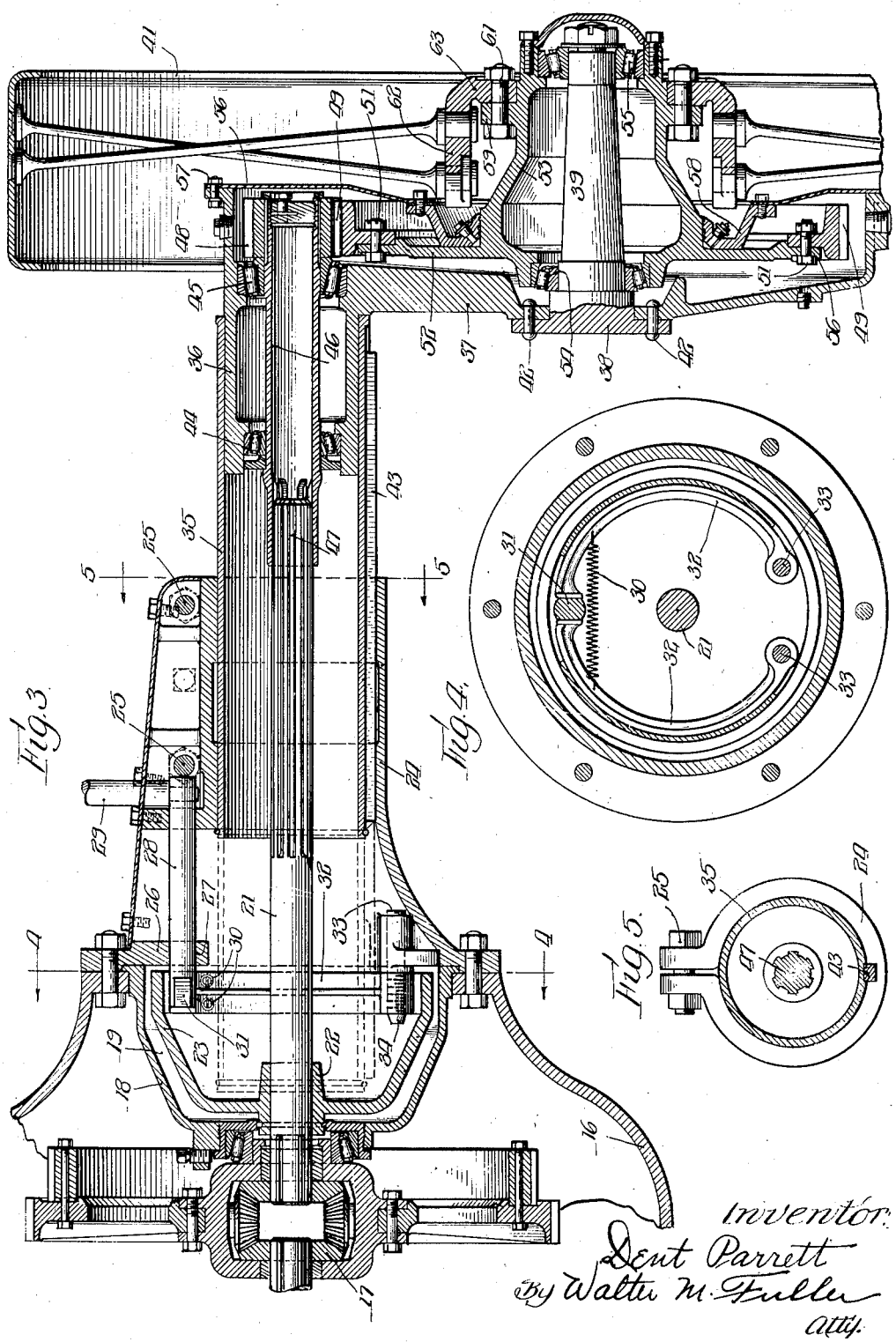
Inventor
Dent Parrett
By Walter M. Fuller
Atty.

Patented Dec. 5, 1933

1,937,839

UNITED STATES PATENT OFFICE 1,937,839

TRACTOR

Dent Parrett, St. Joseph, Mich.

Application September 13, 1930
Serial No. 481,607

7 Claims. (Cl. 180—75)

My present invention pertains to tractors and similar appliances and relates more particularly to features of novelty and advantage in the adjustability of the tread or distance between the drive-wheels, the manner of supporting the main body of the tractor on its carrying-wheels, the means for steering or turning the vehicle, and the mechanism for actuating the drive-wheels.

The benefits which accrue from the employment of the invention will be apparent from an understanding of a present, preferred embodiment thereof, illustrated in the accompanying drawings, forming a part of this specification and to which reference should be had in connection with the following detailed description.

In these drawings, in which like reference numerals have been employed to designate the parts throughout the several views:—

Figure 3 is a fragmentary, vertical cross-section through the differential mechanism and one of the drive or carrying-wheels;

Figure 4 is a vertical cross-section on line 4—4 of Figure 3, the parts being viewed in the direction indicated by the arrows; and Figure 5 is a cross-section on line 5—5 of Figure 3, the parts being seen in the manner indicated by the arrows.

Figure 1:
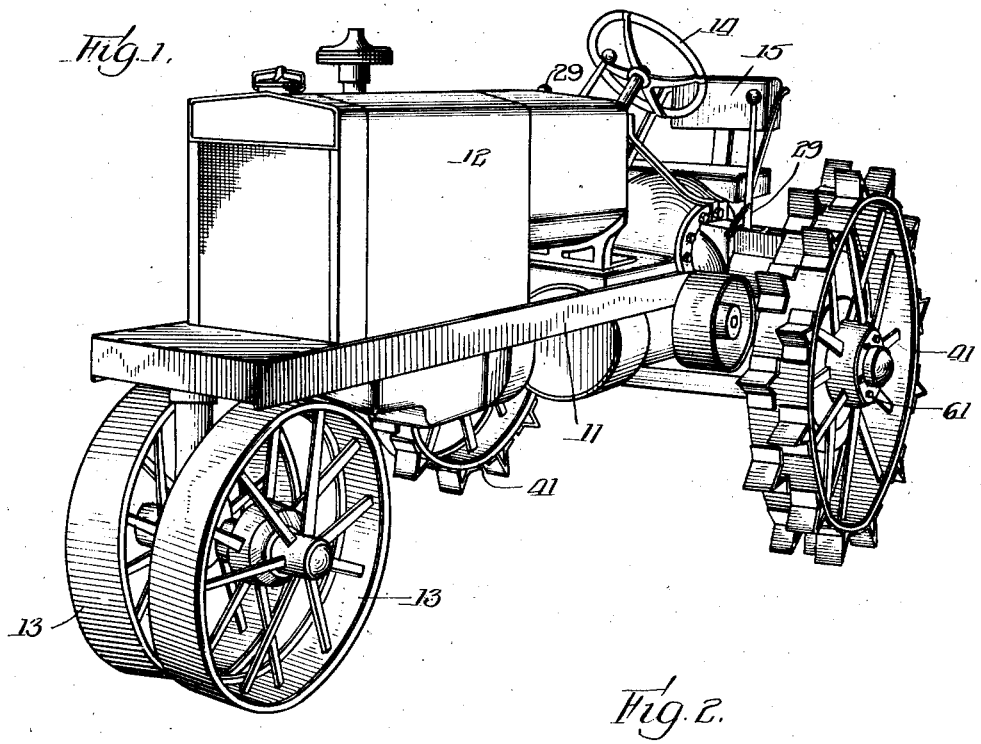
Figure 1 is a front, perspective view of the improved tractor.
Figure 2:
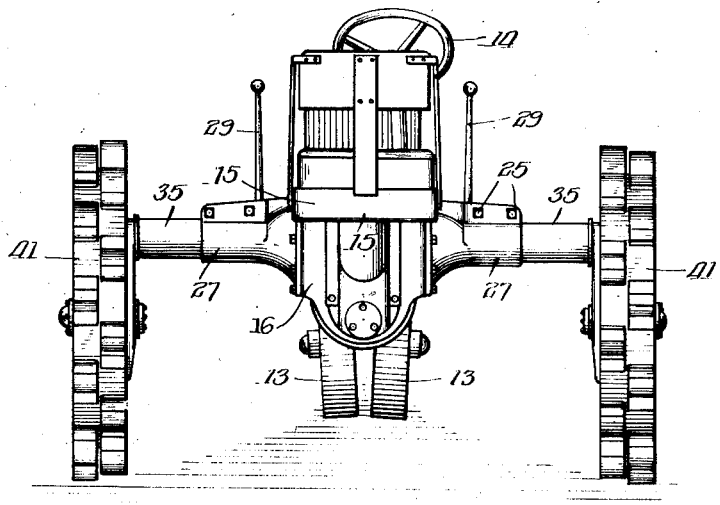
Figure 2 is a rear view of the same.

Referring to these drawings for a complete understanding of the invention from structural and functional standpoints, it will be perceived that the novel and improved tractor includes a body, characterized as a whole 11, equipped with the usual internal-combustion engine, designated 12, such body at its front end being carried on a pair of wheels 13, 13 which may be turned to steer the vehicle by a steering-wheel 14 of customary type, such steering-wheel being connected to the front wheels by a reversible connection of ordinary construction; that is to say, when the steering-wheel is turned it swings the wheels to the one side or the other, whereby the course of travel of the tractor may be as desired, but, if the steering-wheel is left free to revolve and such ground-wheels are turned to the one or the other side by other means hereinafter described, the connection between the steering-wheel and the ground-wheels offers no substantial resistance to such operation, so that under the circumstances hereinafter presented, these front wheels may act as castor wheels.

The rear portion of the tractor body is fitted with a seat 15 for the operator which positions him for easy manipulation of the various controls.

Near its back, such body has a differential-housing 16 accommodating within it the common differential-gearing, denominated as a whole 17, driven in the usual way, not shown, by the engine 12.

As is illustrated, each side of such housing comprises a concave wall 18 affording a substantial recess or cavity 19 within the main body of the housing 16.

Inasmuch as both sides of the machine are the same, a complete description and illustration of one will obviously suffice for the two and such showing has been presented in Figures 3 to 5, inclusive.

The differential-gearing revolves a suitably-journalled drive-shaft 21 to which the hub 22 of a cup-shaped brake-drum 23 is securely fastened, such drum being accommodated, as depicted, in the cavity 19.

Bolted to the side of the differential-casing 16, I provide a longitudinally-split, outstanding tubular-member 24, the upper split section of which may be contracted or allowed to expand slightly by manipulation of clamping bolts 25, 25 extended therethrough, such member having a wall 26 with a bearing 27 for a brake-shaft 28 equipped at its outer end with an upstanding, manually-operated handle 29, the inner cam-shaped end 31 of the shaft being located, as is usual, between the two free ends of a pair of curved brake-shoes 32, 32, faced with suitable friction material, hinged or pivoted at 33, 33 in the lower part of the member 24 and pulled toward one another by a coiled, contractile spring 30 or two of them.

As is fully illustrated, the brake-shoes and their operating cam are located in the cavity or recess 19 and within the exterior boundary of the differential-housing.

Such split tubular-member 24 telescopically or adjustably receives a tube or sleeve 35 which may be slid in the member more or less to secure the desired adjustment of the associated carrying-wheel, and when such tube is in its innermost position, as indicated in dotted lines in Figure 3, its inner end portion extends through the brake-drum and its companion brake-shoes, such construction affording a compact relation of the various elements under such circumstances or condition of the appliance.

Obviously, the tube or sleeve may be fixedly maintained in any adjusted position by tightening the clamping bolts 25, 25 to contract the external encasing member 24 upon it.

At its outer end, such tube or sleeve internally accommodates the upper, tubular or hollow, cylindrical part 36 of a casting 37 to which the base 38 of the spindle 39 of the carrying-wheel 41 is riveted at 42, 42.

In order to prevent sleeve or tube 35 from turning or rotating in the member 24, and at the same time allow it to have a sliding relation therewith, a key and keyway connection 43 is employed between them, and, to preclude the part 36 from turning in the tube or sleeve 35, it has a tight or drive fit therein, or the parts may be welded or otherwise secured together.

A pair of roller-bearings 44, 45 are mounted inside of element 36 and revoluble in these is a hollow shaft 46 having a toothed, notched, or multiple key and keyway connection 47 with drive-shaft 21, so that the two, interfitted shafts may be elongated or contracted without disturbing the operative driving relation of the one to the other.

A pinion 48 is fixed in any approved manner on the outer, protruding end of the tubular or hollow shaft 46 and it meshes with a large gear 49 bolted at 51, 51 to a flange or web 52 constituting part of a hollow hub 53 rotatable on roller-bearings 54, 55 on the spindle or stationary stub shaft 39, the specified gearing being covered by a disc or plate 56 secured to the casting 37 at a number of points 57 and fastened to a ring 58 on the hub 53.

Near its outer end, hub 53 has a shallow flange or circular rib 59 to which is detachably or demountably bolted at 61, 61 the center casting or hub 62 of the corresponding carrying-wheel 41, the securing flange 63 of such hub being at one side of the center plane of the wheel, so that, if desired, the wheel may be demounted, reversed, and again bolted in place to increase the wheel tread of the tractor.

From what precedes, it will be apparent that the tread of the carrying-wheels, that is the distance between them, may be varied or adjusted, as occasion necessitates, by changing the positions of the two tubes or sleeves 35, 35 in their split-housings or tubular-members 24, 24, or such tread may be changed a definite amount by reversing the connections of the carrying-wheels to their hubs, or both such capacities for adjustment may be availed of together, if desired.

It should be noted also that the entire weight of the rear part of the tractor-body is carried on the two drive-wheels 41, 41 through the telescoping parts 24 and 35, the axis of which is at a substantially higher level than the axis of the wheels 41, thus providing a structure with a clearance greater than the radius of such drive-wheels.

Such a straddle construction permits the tractor to be used in a field and to travel astride one or more rows of corn or cotton plants without interference therewith, the distance between the adjustable carrying-wheels being varied or modified from time to time, as conditions warrant or demand.

It will be understood, that owing to the capability of the shafts 21 and 46 to become elongated or shortened automatically with the adjustment of the sleeve or tube 35, they maintain a proper driving relation between the engine and the carrying-wheel for all of the tread adjustments referred to.

Stated somewhat differently, the shaft 21 always maintains its position, but the shaft 46 is so mounted in the part 36 that it moves longitudinally therewith, and because of this construction, the expansion and contraction of the shaft is easily and automatically effected when the tread adjustment is brought about.

The tractor may be operated by steering the front wheels by manipulation of the steering-wheel in the usual way, or, to secure greater ease in turning, by requiring the engine to perform this work, the operator may leave the steering-wheel free to turn and apply either one of the brakes 23, 32 by actuation of its handle 29, with the result that the corresponding wheel becomes locked and does not revolve about its axis, whereas the other wheel travels around the substantially stationary wheel as a center, the front wheels acting, under the circumstances, as castor wheels.

When the tractor is steered in this manner, by locking one wheel by its brake mechanism, the turning radius is determined by the wheel tread, and since the latter is adjustable, the former may be made variable.

Those acquainted with this art will readily understand that this invention, as defined by the appended claims, is not necessarily limited or restricted to the precise and exact details of construction, and that these may be modified within rather wide ranges without departure from the principles of the invention and without the loss or sacrifice of any of its material benefits or advantages.

I claim:

1. In a tractor, the combination of a tractor-body having aligned tubular-members extended outwardly from its opposite sides, tubes telescopically adjustable in said members to vary the tread of the driving-wheels, means to hold said tubes in adjusted positions in said members, supports carried on the outer portions of said tubes, driving-wheels revolubly mounted on said supports, said members, tubes and supports constituting the sole supporting means between said driving-wheels and tractor-body, power-means on said body, and driving means connecting said power-means and driving-wheels including expansible and contractible portions extended through said interfitted members and tubes, the axis of said members and tubes being higher than the axis of said carrying-wheels.

2. In a tractor, the combination of a tractor-body having aligned tubular-members extended outwardly from its opposite sides, tubes telescopically adjustable in said members to vary the tread of the carrying-wheels, means to hold said tubes in adjusted positions in said members, supports carried on the outer portions of said tubes, carrying-wheels revolubly mounted on said supports, power-means on said body, driving means connecting said power-means and carrying-wheels including expansible and contractible portions extended through said interfitted members and tubes, the axis of said members and tubes being higher than the axis of said carrying-wheels, said members and tubes constituting the sole supporting means for said tractor-body on said supports, and brakes for said driving means concentric with and surrounding said tubes when the latter are in their innermost positions.

3. In a tractor, the combination of a tractor-body having aligned longitudinally-split tubular-members extended outwardly from its opposite sides, tubes telescopically adjustable in said members to vary the tread of the carrying-wheels, means to contract said split tubular-members on said tubes to hold them in adjusted positions, supports carried on the outer portions on said tubes, carrying-wheels revolubly mounted on said supports, power-means on said body, and driving means connecting said power-means and carrying-wheels including expansible and contractible portions extended through said interfitted members and tubes, the axis of said members and tubes being higher than the axis of said carrying-wheels.

4. In a tractor, the combination of a tractor-body having aligned tubular members extended outwardly from its opposite sides, tubes telescopically adjustable in said members to vary the tread of the carrying-wheels, means to hold said tubes in adjusted positions in said members, supports carried on the outer portions of said tubes, carrying-wheel hubs revoluble on said supports, carrying-wheels detachably mounted off-center on said hubs and capable of reversal to change the tread between the wheels, power-means on said body, and driving means connecting said power-means and carrying-wheels including expansible and contractible portions extended through said interfitted members and tubes, the axis of said members and tubes being higher than the axis of said carrying-wheels.

5. In a tractor, the combination of a tractor-body having aligned tubular-members extended outwardly from its opposite sides, tubes telescopically adjustable in said members to vary the tread of the carrying-wheels, means to hold said tubes in adjusted positions in said members, supports carried on the outer portions of said tubes, carrying-wheels revolubly mounted on said supports, power-means on said body, and driving means connecting said power-means and carrying-wheels including a sleeve in each of said tubes, bearing-means in each of said sleeves, a hollow shaft revoluble in each of said bearing-means, a drive-shaft having a telescopic connection with each of said hollow shafts, a pinion on each of said hollow shafts, and a gear connected to each of said carrying-wheels and in mesh with the corresponding pinion.

6. In a tractor, the combination of a tractor-body having aligned tubular-members extended outwardly from its opposite sides, tubes telescopically adjustable in said members to vary the tread of the carrying-wheels, means to hold said tubes in adjusted positions in said members, supports carried at the outer ends of said tubes, each of said supports having integral therewith a hollow portion fitted in the corresponding tube, and a substantially upright portion extended downwardly from said hollow portion, bearing-means in each such hollow portion, a shaft in each of said bearing-means, a drive shaft for and having a telescopically adjustable driving connection with each of said shafts, a pinion at the outer end of each of said first shafts, power-means on said tractor-body, means to rotate said drive shafts by said power-means, a spindle mounted on each of said supports, a hub revoluble on each of said spindles, a gear fastened to each of said hubs and in mesh with the corresponding pinion, and a carrying-wheel mounted on each of said hubs.

7. In a tractor, the combination of a tractor-body, aligned tubular-members extended outwardly from the opposite sides of the tractor-body and having internal bearing portions of less length than said members, tubes slidable in said bearing portions and telescopically adjustable in said members to vary the tread of the carrying-wheels, said tubes occupying the full length of said bearing portions in all of their positions of adjustment, means to hold said tubes in their adjusted positions in said members, supports carried on the outer portions of said tubes, carrying-wheels revolubly mounted on said supports, power-means on said body, and driving means connecting said power-means and carrying-wheels including expansible and contractible portions extended through said interfitted members and tubes, the axis of said members and tubes being higher than the axis of said carrying-wheels, said members and tubes constituting the sole supporting means for said tractor-body on said supports.

DENT PARRETT.